(12) United States Patent
Bladh et al.

(10) Patent No.: US 10,465,390 B2
(45) Date of Patent: Nov. 5, 2019

(54) THIN DECORATIVE SURFACE COVERING

(71) Applicant: Tarkett GDL, Lentzweiler (LU)

(72) Inventors: Jonas Bladh, Wiltz (LU); Jean-Yves Simon, Wiltz (LU); Frédéric Pailler, Wiltz (LU); Richard Peres, Wiltz (LU)

(73) Assignee: Tarkett GDL, Lentzweiler (LU)

( * ) Notice: Subject to any disclaimer, the term of this patent is extended or adjusted under 35 U.S.C. 154(b) by 0 days.

(21) Appl. No.: 15/512,302

(22) PCT Filed: Sep. 18, 2015

(86) PCT No.: PCT/EP2015/071470
§ 371 (c)(1),
(2) Date: Mar. 17, 2017

(87) PCT Pub. No.: WO2016/042142
PCT Pub. Date: Mar. 24, 2016

(65) Prior Publication Data
US 2017/0247890 A1    Aug. 31, 2017

(30) Foreign Application Priority Data

Sep. 18, 2014 (EP) .................................... 14185422

(51) Int. Cl.
*E04F 15/02*        (2006.01)
*E04F 15/10*        (2006.01)
(Continued)

(52) U.S. Cl.
CPC .......... *E04F 15/02038* (2013.01); *B32B 3/30* (2013.01); *B32B 37/14* (2013.01);
(Continued)

(58) Field of Classification Search
CPC .............. E04F 15/02038; E04F 15/107; E04F 2201/042; E04F 2201/043; E04F 2201/023; E04F 2201/0123; B32B 37/14; B32B 3/30; B32B 2307/536; B32B 2451/00; B32B 2471/00
See application file for complete search history.

(56) References Cited

U.S. PATENT DOCUMENTS 8,689,513 B2 *  4/2014  Windmoller ............ E04F 15/02
                                                     52/588.1
9,624,678 B2 *  4/2017  Segaert ................. B29C 70/081
(Continued)

FOREIGN PATENT DOCUMENTS

EP         2248665 A1    11/2010
EP         2339092 A1    6/2011
(Continued)

*Primary Examiner* — Basil S Katcheves
*Assistant Examiner* — Omar F Hijaz
(74) *Attorney, Agent, or Firm* — Reinhart Boerner Van Deuren P.C.

(57) ABSTRACT

A decorative surface covering element has a height of 4 mm or less from its top surface to the bottom surface. The surface covering element is configured as a multi-layered compound with a polymer-based core layer laminated between a backing layer and a wear layer, the core layer comprising a core material having a lesser shore hardness than the backing layer and the wear layer. The surface covering element comprises a first connecting profile, integral with the multi-layered compound, that extends along at least one of the edges of the surface covering element. The first connecting profile comprises at least one protrusion realized in the core layer, the protrusion having side surfaces for being seized between opposite surfaces of a recess in a second connecting profile, configured for mating with the first connecting profile, of another decorative surface covering element.

18 Claims, 5 Drawing Sheets

(51) Int. Cl.
*B32B 3/30* (2006.01)
*B32B 37/14* (2006.01)

(52) U.S. Cl.
CPC ......... *E04F 15/105* (2013.01); *E04F 15/107* (2013.01); *B32B 2307/536* (2013.01); *B32B 2451/00* (2013.01); *B32B 2471/00* (2013.01); *E04F 2201/0115* (2013.01); *E04F 2201/0123* (2013.01); *E04F 2201/0146* (2013.01); *E04F 2201/0161* (2013.01); *E04F 2201/023* (2013.01); *E04F 2201/042* (2013.01); *E04F 2201/043* (2013.01)

(56) References Cited

U.S. PATENT DOCUMENTS

| | | | | |
|---|---|---|---|---|
| 9,745,758 | B2* | 8/2017 | Baert | E04F 15/107 |
| 9,771,726 | B2* | 9/2017 | Edmonds | E04F 15/107 |
| 2002/0178675 | A1* | 12/2002 | Valentine | E04F 15/225 |
| | | | | 52/403.1 |
| 2008/0000179 | A1* | 1/2008 | Pervan | B27F 1/06 |
| | | | | 52/390 |
| 2008/0289289 | A1* | 11/2008 | Wiercinski | B32B 27/12 |
| | | | | 52/745.06 |
| 2009/0246432 | A1* | 10/2009 | Wang | B60R 11/00 |
| | | | | 428/36.8 |
| 2013/0047536 | A1* | 2/2013 | Pervan | B26D 1/14 |
| | | | | 52/309.1 |
| 2017/0144403 | A1* | 5/2017 | Morey | A47G 27/00 |

FOREIGN PATENT DOCUMENTS

| | | |
|---|---|---|
| EP | 2586929 A1 | 5/2013 |
| WO | WO 2010/072357 A2 | 7/2010 |
| WO | WO 2010/094597 A1 | 8/2010 |
| WO | WO 2011/087704 A1 | 7/2011 |
| WO | WO 2013/044377 A1 | 4/2013 |
| WO | WO 2013/179260 A1 | 12/2013 |

* cited by examiner

THIN DECORATIVE SURFACE COVERING

FIELD OF THE INVENTION

The present invention relates to a polymer-based decorative surface covering element in the form of a strip, tile, plank or the like, comprising connecting means integrally formed therein.

BACKGROUND OF THE INVENTION

Polymer-based surface coverings, also called polymeric or synthetic surface coverings are well known. Generally they are made of rubber, polyolefins, polyesters, polyamides or PVC. They present specific mechanical properties, particularly in terms of mechanical resistance, wear and indentation resistance, but also in terms of comfort, softness, sound and heat insulation.

Among polymer-based surface coverings, substrate-free surface coverings and multilayer surface coverings are also well known.

Substrate-free surface coverings, or homogenous surface coverings, are coverings comprising agglomerated particles, generally obtained by cutting or shredding a sheet made from a composition which comprises a polymer-based material and wherein no bottom layer, or backing, is used.

Multilayer surface coverings are coverings comprising at least a lower layer being a support layer and an upper layer being a wear layer. These coverings may comprise a decorative pattern imitating the aesthetic appearance of natural floorings such as wood or stone floorings. Such decorative pattern is generally printed on one of the faces of the support layer or the wear layer of the floor covering, or sometimes on an additional synthetic layer which is inserted between the support layer and the wear layer.

WO 2010/094597 discloses synthetic floor covering elements in the form of strips having a width corresponding to the width of a natural floor covering element to be imitated and a length corresponding to the length of at least two natural floor covering elements to be imitated.

Polymer-based surface coverings are typically laid on the surface to be covered (e.g. the floor or a wall) using adhesive. This has the drawback of not being an easy task, in particular if the glue must be spread on the surface before the surface covering elements are laid. As an alternative, glue may be provided on the face of the surface covering entering into contact with the surface to cover. In this case, a protective sheet or release paper has to be removed before the surface covering element can be laid on the surface to cover.

EP 2 248 665 A1 discloses a thermoplastic laminate plank, which comprises a core comprising at least polyvinyl chloride (PVC). The core has a top surface, a bottom surface and opposing sides. The plank further comprises a print layer affixed to the top surface of the core and a protective layer affixed to the top surface of the print layer. The PVC of the core is preferably flexible and the core has at least one groove located on one of its sides. Two neighbouring planks are connected by means of a tongue or spline inserted along the lengths of the adjoining grooves.

TECHNICAL PROBLEM

It is an object of an aspect of the present invention to propose particularly thin decorative surface covering elements with coupling means that allow easy assembly on the surface to cover.

GENERAL DESCRIPTION

A decorative surface covering element in accordance with the invention has a height of 4 mm or less (e.g. from 2.5 mm to 4 mm, more preferably from 2.8 mm to 3.8 mm, and still more preferably from 2.8 mm to 3.5 mm) from its top surface to the bottom surface. The surface covering element is configured as a multi-layered compound with a polymer-based (preferably PVC-based and/or thermoplastic) core layer laminated between a backing layer and a wear layer, the core layer comprising a core material having a lesser shore hardness than the backing layer and the wear layer. The core layer may itself be composed of one or more layers (hereinafter termed "core sub-layers"). The core sub-layers are preferably consisting of thermoplastic material and/or be PVC-based. The surface covering element comprises a first connecting profile, integral with the multi-layered compound, that extends along at least one of the edges (or flanks) of the surface covering element. The first connecting profile comprises at least one protrusion realised in the core layer, the protrusion having side surfaces for being seized between opposite surfaces of a recess in a second connecting profile, configured for mating with the first connecting profile, of another decorative surface covering element.

As the core layer is soft in comparison to the wear layer and the backing layer, a retention between the first and second connecting profiles of two neighbouring surface covering elements can be achieved. Preferably, the core layer has a coefficient of dynamic friction comprised in the range from 0.50 to 0.65, more preferably in the range from 0.55 to 0.60, when determined according to European Standard EN 13893.

Preferably, the protrusion comprises a tongue extending parallel to the layers (i.e. the core layer, the backing layer, the wear layer and any further layer) of the surface covering element.

According to preferred embodiments of the invention, the first connecting profile comprises a connector base extending parallel to the layers and the protrusion comprises a ridge elevated or lowered from the connector base.

Alternatively or additionally, the first connecting profile may comprise a plurality of protrusions formed as mutually parallel ridges elevated or lowered from the connector base.

Advantageously, the protrusion comprises a barb profile for engaging the recess of the second connecting profile of another surface covering element.

The decorative surface covering element preferably comprises a second connecting profile, integral with the multi-layered compound, extending along another one of the edges, the second connecting profile comprising at least one recess realised in the core layer, the recess having opposite surfaces for seizing a protrusion of a first connecting profile of another decorative surface covering element.

In order to achieve good retention of the first connecting profile within the second connecting profile, the connecting profiles are preferably shaped in such a way that the contact surface that forms in the connected state amounts at least to 7 mm$^2$ per mm along the edges of the adjacent surface covering elements (i.e. for each length of 1 mm parallel to the edges in contact, the contact surface amounts to at least 7 mm$^2$). The contact surface that forms in the connected state more preferably amounts at least to 9 mm$^2$, still more preferably to at least 12 mm$^2$ and yet even more preferably to at least 15 mm$^2$, per mm along the edges of the adjacent surface covering elements.

The recess may comprise an undercut for cooperating with a barb profile of a first connecting profile.

According to a preferred embodiment, the second connecting profile comprises a connector base extending parallel to the layers and a ridge elevated or lowered therefrom. Alternatively or additionally, connector base has formed therein a plurality of mutually parallel recesses.

The first and second connecting profiles may be shaped in such a way that elastic deformation of at least one of the first and second connecting profiles is necessary when the decorative surface covering element is connected with another decorative surface covering element.

According to preferred embodiments, the core layer comprises a fiberglass mat (or fiberglass veil) embedded and anchored in the polymer-based core material, the fiberglass mat extending into the first connecting profile and/or into the second connecting profile. The fiberglass mat in this case forms a core sub-layer as mentioned before. The fiberglass mat, which may be of the woven or non-woven type, preferably has a thickness comprised in the range from 0.05 mm to 0.1 mm. The fiberglass mat is coarsely meshed, such that the core material forms one continuous layer penetrating across the openings and interstices of the fiberglass mat and thereby firmly anchors it within the core layer.

According to a preferred aspect of the invention, the backing layer and the wear layer of the decorative surface covering element have each a shore C hardness of at least 80 and the core layer has a shore C hardness at least 5 units below the lower of the shore C hardness of the backing layer and the shore C hardness of the wear layer.

Preferably, the core layer has a thickness amounting to a value in the range from 0.8 mm to 2.5 mm.

An aspect of the invention relates to a method for installing a decorative surface covering on a floor. Such a method comprises:
  providing decorative surface covering elements as described hereinabove, the decorative surface covering elements being rectangular and comprising the first and second connecting profiles on a first and a second long edge, respectively, and a third and a fourth connecting profile on a first and a second short edge, respectively;
  laying out the decorative surface covering elements row by row in such a way that the first connecting profile is at the 12 o'clock position, the third connecting profile at the 3 o'clock position, the second connecting profile at the 6 o'clock position and the fourth connecting profile at the 9 o'clock position relative to the person laying out the tiles;
  when laying a decorative surface covering element, inserting the first connecting profile thereof into the second connecting profile of the decorative surface lo covering elements of the previous row, lowering the decorative surface covering element onto the floor, sliding the decorative surface covering element to the left or the right while keeping the decorative surface covering element connected with the previous row (and parallel to the floor) and connecting the decorative surface covering element with a previously installed decorative surface covering element on the left or on the right using the third and fourths connecting profiles.

BRIEF DESCRIPTION OF THE DRAWINGS

The accompanying drawings illustrate several aspects of the present invention and, together with the detailed description, serve to explain the principles thereof. In the drawings.

The reader's attention is drawn to the fact that the drawings are not to scale. Furthermore, for the sake of clarity, proportions between height, length and/or width may not be represented correctly. Last but not least, gaps between engaged connecting profiles may be drawn greater or smaller than they would be in a real implementation of the invention.

DETAILED DESCRIPTION OF PREFERRED EMBODIMENTS

Figure 1:
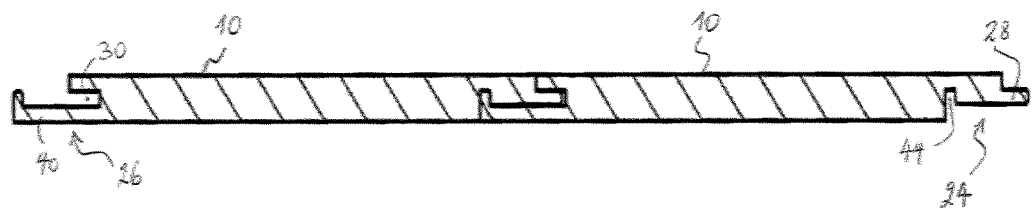
FIG. 1: is a cross-sectional schematic view of two decorative surface covering elements in accordance with a first embodiment of the invention.
Figure 2:
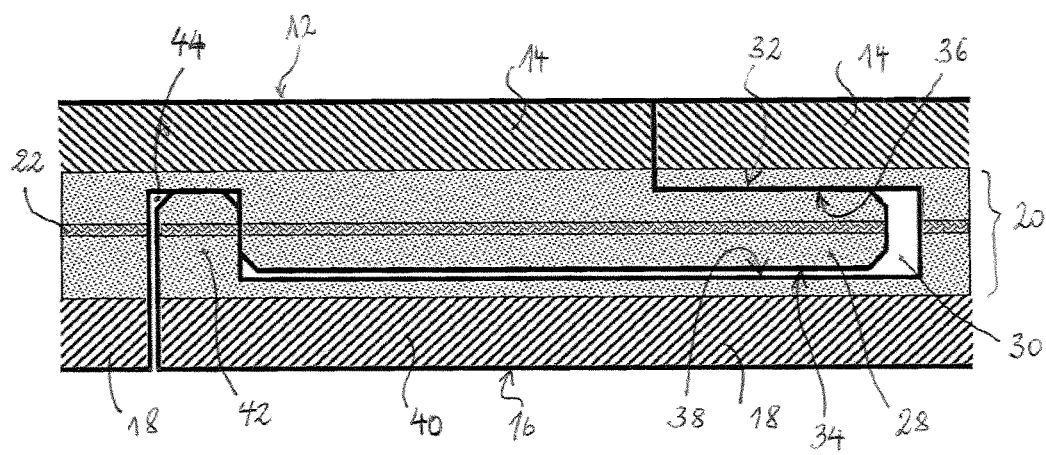
FIG. 2: is a transversal cross-sectional view of the connecting profiles of the decorative surface covering elements of FIG. 1.

FIGS. 1 and 2 show laminate planks 10 forming decorative surface covering elements for a floor according to a first preferred embodiment of the invention. The top surface 12 of the planks 10 is provided by a wear layer 14, whereas the bottom surface 16 is provided by a backing layer 18. The backing layer 18 and the wear layer 12 sandwich a PVC-based core layer 20. Possibly, a print layer (not shown) is arranged between the core layer 20 and the wear layer 14. If a print layer is provided, the wear layer 14 is realised in a transparent material. Optionally, one or more barrier layers are provided between the layers so far mentioned in order to reduce migration of chemical compounds (e.g. plasticisers) between the layers. All layers are laminated together to form a multi-layered compound.

The PVC-based core layer 20 is softer (i.e. it has a lesser shore hardness) than the backing layer 18 and the wear layer 14 in order to give the surface covering element the desired resilience and flexibility. The choice of a softer material for the core layer 20 also allows to give the multi-layered compound the desired resilience, which is especially useful in flooring applications.

The thickness (or height) of the core layer 20 (including any fiberglass mat 22) preferably amounts to between 0.8 mm and 2.5 mm. The backing layer 18 preferably has a thickness amounting to between 0.4 mm and 1.5 mm. The wear layer 14 preferably has a thickness between 0.2 mm and 1 mm. If the multi-layered compound further comprises a print layer between the core layer and the wear layer, its thickness typically amounts to between 0.05 mm and 0.2 mm. The thicknesses of the different layers are chosen such that the laminate plank 10 has a total height of at most 4 mm, preferably at most 3.5 mm and still more preferably at most 3.2 mm. According to a most preferred version of this embodiment of the invention, the total thickness of the laminate plank amounts to 3 mm (wear layer: 0.7 mm, print layer: 0.1 mm, core layer, including all core sub-layers: 1.7 mm, backing layer: 0.5 mm).

Each laminate plank 10 comprises first and second connecting profiles 24, 26, which are both integral with the multi-layered compound. The first connecting profile 24 extends along a first edge (or flank) of the surface covering element (in FIGS. 1 and 2, that is perpendicular to the plane of the drawing), while the second connecting profile 26 extends along a second edge of the surface covering element. The first and second connecting profiles 24, 26 are configured for mating with each other and thereby mechanically coupling two adjacent laminate planks 10.

The first connecting profile 24 comprises a tongue 28, while the second connecting profile 26 comprises a corresponding recess 30, both the tongue 28 and the recess 30 being realised in the core layer 20. The tongue 28 forms a protrusion having side surfaces 32, 34 for being seized between opposite surfaces 36, 38 of the recess 30 in the second connecting profile 26 of the neighbouring laminate plank. For additional retention strength the bottom part 40 of the second connecting profile 26 is configured as a generally L-shaped tongue. The shorter leg 42 of the L extends perpendicular to the parallel layers 14, 20, 18 of the multi-layered compound and cooperates with a complementarily shaped undercut 44 in the first connecting profile 24.

As can be best seen in FIG. 2, the core layer 20 has a fiberglass mat 22 embedded therein. The fiberglass mat 22 is positioned in the mechanically neutral plane of the laminate plank, which is at least approximately at mid-height of the core layer 20. The fiberglass mat 22 extends into the tongue 28 of the first connecting profile 24 and the extremity 42 of the L-shaped tongue 40 of the second connecting profile 26. The fiberglass mat 22 enhances dimensional stability and strength of the core layer 20. The thickness of the fiberglass mat 22 is preferably comprised in the range from 0.07 to 0.12 mm. It is coarsely meshed, such that the PVC-based material of the core layer 20 forms one continuous layer penetrating across the openings and interstices (not shown) of the fiberglass mat 22 and firmly retaining the latter. Thanks to the fact that the fiberglass mat 22 extends into the protrusions of the first and second connecting profiles 24, 26, the connection presents improved resistance to tensile strain.

To guarantee the durability of the connection, the core material is chosen such that its coefficient of dynamic friction lies in the range from 0.50 to 0.65 (determined according to European Standard EN 13893.) Furthermore, in the embodiment illustrated in FIGS. 1 and 2, the first and second connecting profiles 24, 26 are shaped such that a contact area (between to engaged connecting profiles) of at least 12 mm$^2$ per mm of length along the edge (i.e. perpendicular to the plane of the drawings) is formed.

It should also be noted that, in order to couple the first connecting profile 24 with the second connecting profile 26, the tongue 28 must first be inserted obliquely into the recess 30. To further insert the tongue 28 and to bring the tiles to be connected into alignment, the tongue 28 itself and the end portion 42 of the L-shaped tongue 40 must be elastically deformed.

Figure 3:
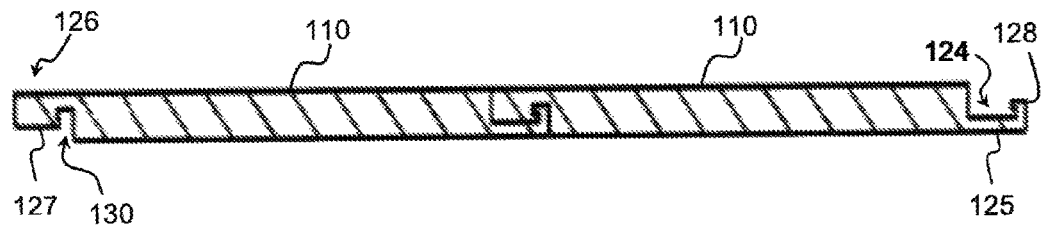
FIG. 3: is a cross-sectional schematic view of two decorative surface covering elements in accordance with a second embodiment of the invention.
Figure 4:
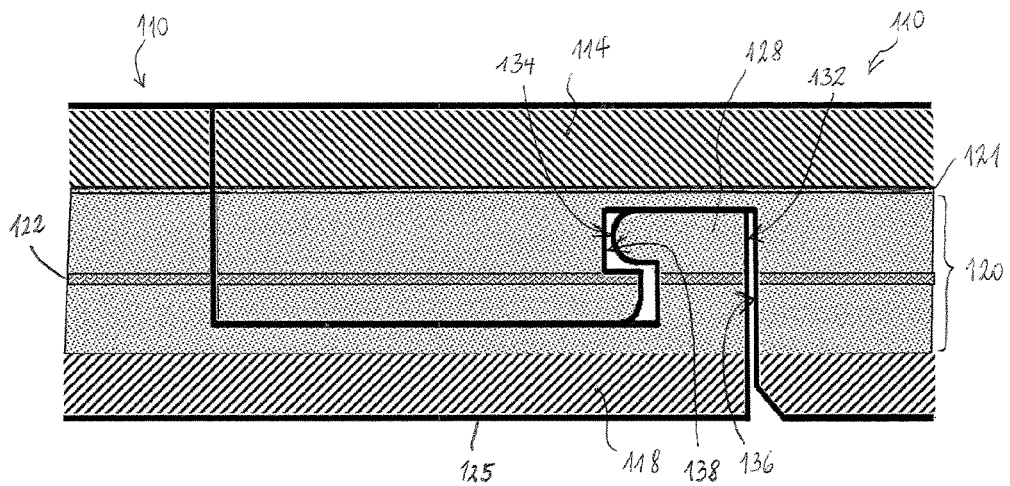
FIG. 4: is a transversal cross-sectional view of the connecting profiles of the decorative surface covering elements of FIG. 3.
Figure 5:
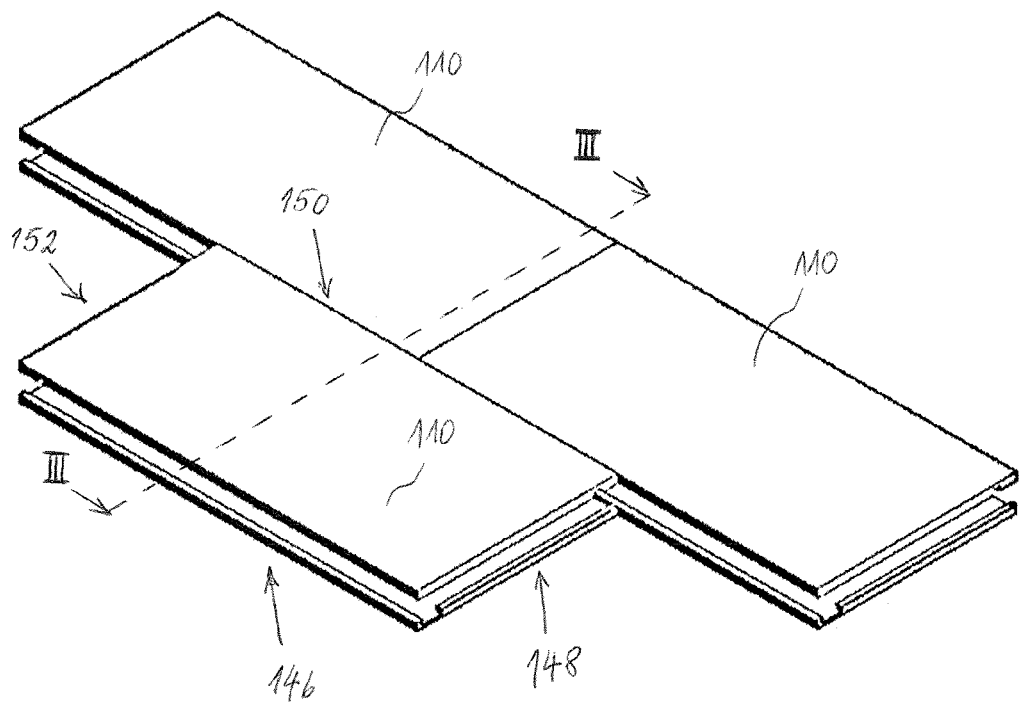
FIG. 5: is a perspective view of the decorative surface covering elements of FIGS. 3 and 4.

FIGS. 3, 4 and 5 relate to a second preferred embodiment of the invention, wherein the decorative surface covering elements are laminate tiles 110. Each tile 110 is formed by a multi-layered compound comprising a backing layer 118, a PVC-based core layer 120, a print layer 121 and a transparent wear layer 114. Optionally, the multi-layered compound comprises further layers, such as e.g. one or more barrier layers and/or a top varnish.

The PVC-based core layer 120 has a lesser shore hardness than the backing layer 118 and the wear layer 114 in order to give the tiles 110 the desired resilience and flexibility. The thickness (or height) of the core layer 120 (including any fiberglass mat 122) preferably amounts to between 0.8 mm and 2.5 mm. The backing layer 118 preferably has a thickness amounting to between 0.4 mm and 1.5 mm. The wear layer 114 preferably has a thickness between 0.2 mm and 1 mm. The thickness of the print layer 121 amounts to between 0.05 mm and 0.2 mm. The thicknesses of the different layers are chosen such that the tile 110 has a total height of at most 4 mm, preferably at most 3.5 mm and still more preferably at most 3.2 mm. According to a most preferred version of this embodiment of the invention, the total thickness of the laminate tile amounts to 3 mm (wear layer: 0.7 mm, print layer: 0.1 mm, core layer, including all core sub-layers: 1.7 mm, backing layer: 0.5 mm).

Each tile 110 comprises first and second connecting profiles 124, 126, which are integral with the multi-layered compound. The first connecting profile 124 extends along a first edge 146 and an adjacent second edge 148 of the surface covering element. The second connecting profile 126 extends along a third edge 150, opposite to the first edge 146 and a fourth edge 152 opposite the second edge 148. The first and second connecting profiles 124, 126 are configured for mating with each other and thereby mechanically coupling two adjacent tiles 110.

The first connecting profile 124 comprises a connector base 125, extending parallel to the layers of the tile, and a barb-profiled ridge 128 elevated from the outer end of the connector base 125. The second connecting profile 126 is shaped complementarily to the first connecting profile 124. It comprises a connector base 127 having a recess 130 formed therein. The recess has an undercut 144 for cooperating with the protrusion of the first connecting profile, i.e. the barb-profiled ridge 128. Both the barb-profiled ridge 128 and the recess 130 are realised in the core layer 120. The barb-profiled ridge 128 has side surfaces 132, 134 for being seized between opposite surfaces 136, 138 of the recess 130 in the second connecting profile 126 of the neighbouring tile.

As can be best seen in FIG. 4, the core layer 120 has a fiberglass mat 122 embedded therein. The fiberglass mat 122 is positioned at least approximately at mid-height of the core layer 120 and extends into barb-profiled ridge 128 of the first connecting profile 124 and into the connector base 127 of the second connecting profile 126. The fiberglass mat 122 is located in the mechanically neutral plane of the tile and it enhances dimensional stability and strength of the core layer 120. The thickness of the fiberglass mat 122 is preferably comprised in the range from 0.07 to 0.12 mm. It is coarsely meshed, such that the PVC-based material of the core layer 120 forms one continuous layer penetrating across the openings and interstices (not shown) of the fiberglass mat 122 and firmly retaining the latter. Thanks to the fact that the fiberglass mat 122 extends into the protrusions of the first and second connecting profiles 124, 126, the connection presents improved resistance to tensile strain.

To guarantee the durability of the connection, the core material is chosen such that its coefficient of dynamic friction lies in the range from 0.50 to 0.65 (determined according to European Standard EN 13893.) Furthermore, in the embodiment illustrated in FIGS. 3 to 5, the first and second connecting profiles 124, 126 are shaped such that a contact area (between to engaged connecting profiles) of at least 9 mm² per mm of length along the edge is formed.

Figure 6:
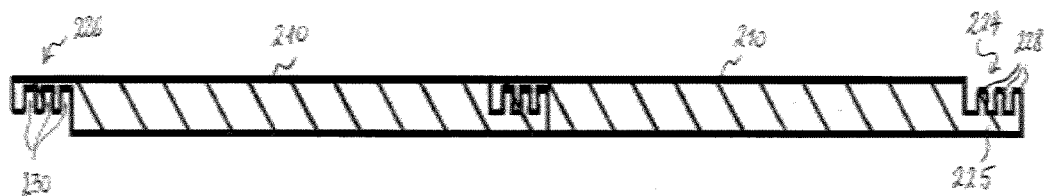
FIG. 6: is a cross-sectional schematic view of two decorative surface covering elements in accordance with a third embodiment of the invention.
Figure 7:
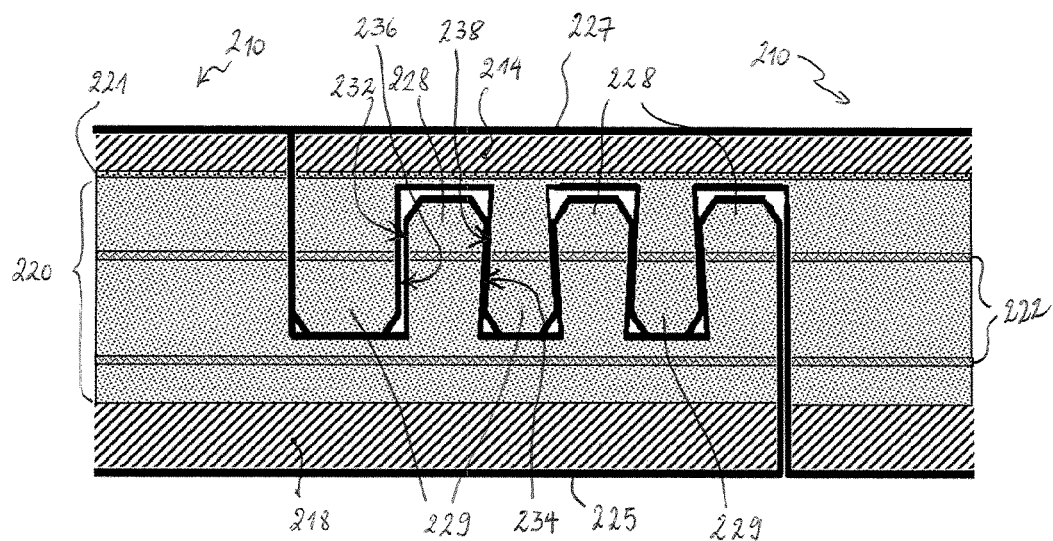
FIG. 7: is a transversal cross-sectional view of the connecting profiles of the decorative surface covering elements of FIG. 6.

A third preferred embodiment of the invention, with laminate tiles or planks as the decorative surface covering elements, is illustrated in FIGS. 6 and 7. Each plank or tile 210 is formed by a multi-layered compound comprising a backing layer 218, a PVC-based core layer 220, a print layer 221 and a transparent wear layer 214. The multi-layered compound may comprise further layers, such as e.g. one or more barrier layers and/or a top varnish.

As in the other embodiments of the invention, the PVC-based core layer 220 has a lesser shore hardness than the backing layer 218 and the wear layer 214. The thickness (or height) of the core layer 220 (including any fiberglass mat 222) preferably amounts to between 0.8 mm and 2.5 mm. The backing layer 218 preferably has a thickness amounting to between 0.4 mm and 1.5 mm. The wear layer 214 preferably has a thickness between 0.2 mm and 1 mm. The thickness of the print layer 221 amounts to between 0.05 mm and 0.2 mm. The thicknesses of the different layers are chosen such that the tile or plank 210 has a total height of at most 4 mm, preferably at most 3.5 mm and still more preferably at most 3.2 mm. According to a most preferred version of this embodiment of the invention, the total thickness of the laminate plank or tile amounts to 3 mm (wear layer: 0.7 mm, print layer: 0.1 mm, core layer, including all core sub-layers: 1.7 mm, backing layer: 0.5 mm).

Each tile or plank 210 comprises first and second connecting profiles 224, 226, which are integral with the multi-layered compound. The first connecting profile 224 extends along at least one edge of the surface covering element. The second connecting profile 226 extends along at least one other edge. The first and second connecting profiles 224, 226 are configured for mating with each other and thereby mechanically coupling two adjacent tiles or planks 210.

The first connecting profile 224 comprises a connector base 225, extending parallel to the layers of the tile or plank 210, and several parallel ridges 228 elevated from the top side of the connector base 225. The second connecting profile 226 is shaped complementarily to the first connecting profile 224. It comprises a connector base 227 having several parallel ridges 229 lowered from its bottom side. The lowered ridges define a plurality of recesses 130 that receive the protrusions (i.e. the elevated ridges 228) of the first connecting profile 224. The elevated ridges 228 and the lowered ridges 229 are all realised in the core layer 220. Each elevated ridge 228 has side surfaces 232, 234 for being seized between opposite surfaces 236, 238 of the corresponding recess 230 in the second connecting profile 226 of the neighbouring tile or plank.

As can be best seen in FIG. 7, the core layer 220 has two fiberglass mats 222 embedded therein. The fiberglass mats 222 extend into first and second connecting profiles 224, 226. The fiberglass mats 222 enhance dimensional stability and strength of the core layer 220. The thickness of the fiberglass mats 222 is preferably comprised in the range from 0.07 to 0.12 mm. They are coarsely meshed, such that the PVC-based material of the core layer 220 forms one continuous layer penetrating across the openings and interstices (not shown) of the fiberglass mats 222 and firmly retaining the latter. Thanks to the fact that the fiberglass mats 222 extend into the protrusions of the first and second connecting profiles 224, 226, the connection presents improved resistance to tensile strain.

To guarantee the durability of the connection, the core material is chosen such that its coefficient of dynamic friction lies in the range from 0.50 to 0.65 (determined according to European Standard EN 13893.) Furthermore, in the embodiment illustrated in FIGS. 6 and 7, the first and second connecting profiles 224, 226 are shaped such that a contact area (between to engaged connecting profiles) of at least 15 mm² per mm of length along the edge is formed.

Figure 8:
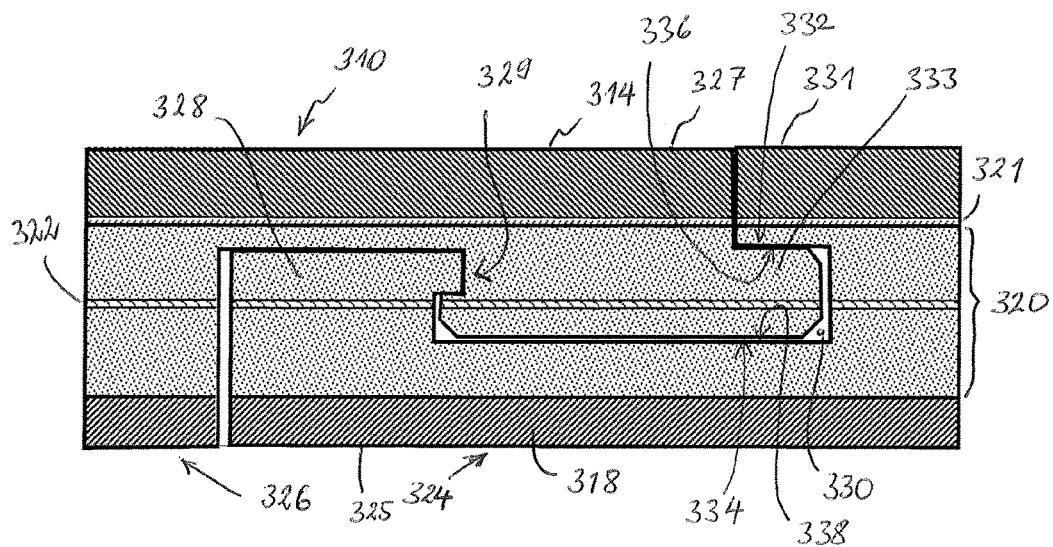
FIG. 8: is a transversal cross-sectional view of first and second connecting profiles of decorative surface covering elements in accordance with a fourth embodiment of the invention.
Figure 9:
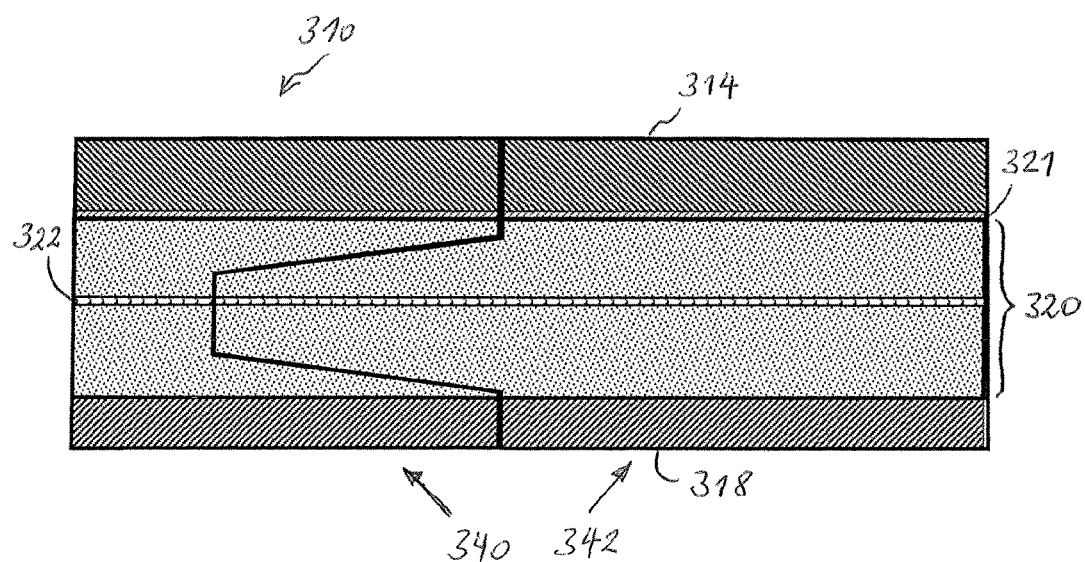
FIG. 9: is a transversal cross-sectional view of third and fourth connecting profiles of the decorative surface covering elements of FIG. 8.

A fourth preferred embodiment of the invention, with planks as the decorative surface covering elements, is illustrated in FIGS. 8 and 9. Each plank 310 is formed by a multi-layered compound comprising a backing layer 318, a PVC-based core layer 320, a print layer 321 and a transparent wear layer 314. The multi-layered compound may comprise further layers, such as e.g. one or more barrier layers and/or a top varnish.

As in the other embodiments of the invention, the PVC-based core layer 320 has a lesser shore hardness than the backing layer 318 and the wear layer 314. The thickness (or height) of the core layer 320 (including any fiberglass mat 322) preferably amounts to between 0.8 mm and 2.5 mm. The backing layer 318 preferably has a thickness amounting to between 0.4 mm and 1.5 mm. The wear layer 314 preferably has a thickness between 0.2 mm and 1 mm. The thickness of the print layer 321 amounts to between 0.05 mm and 0.2 mm. The thicknesses of the different layers are chosen such that the plank 310 has a total height of at most 4 mm, preferably at most 3.5 mm and still more preferably at most 3.2 mm. According to a most preferred version of this embodiment of the invention, the total thickness of the plank amounts to 3 mm (wear layer: 0.7 mm, print layer: 0.1 mm, core layer, including all core sub-layers: 1.7 mm, backing layer: 0.5 mm).

Each plank 310 comprises first and second connecting profiles 224, 226, which are integral with the multi-layered compound. The first connecting profile 324 extends along at least one long edge of the surface covering element. The second connecting profile 326 extends along the other long edge. The first and second connecting profiles 324, 326 are configured for mating with each other and thereby mechanically coupling two adjacent tiles or planks 310.

The first connecting profile 324 comprises a connector base 325, extending parallel to the layers of the tile or plank 310, and a hook-shaped ridge 328 elevated from the top side of the connector base 325. Opposite the hooked side 329 of the ridge 328, the first connecting profile 324 comprises a recess 330, delimited toward the bottom by the connector base 325 and toward the top by an overhang 331. The second connecting profile 326 is shaped complementarily to the first connecting profile 324. It comprises an overhanging connector base 327 with a tongue 333 that forms a protrusion having top and bottom surfaces 332, 334 for being seized between opposite surfaces 336, 338 of the recess 330 in the first connecting profile 326 of the neighbouring laminate plank 310. The front edges of the tongue are chamfered for facilitating insertion of the tongue into the recess 330. On the rear side of the tongue 333, a toothed profile is provided for co-operating with the hooked side 329 of the ridge 328. The toothed profile comprises a chamfered bottom edge.

It is apparent from FIG. 8 that the first and second connecting profiles cannot be assembled without resilient deformation of at least the first or the second connecting profile. To assemble the connecting profiles, the tongue 333 is inserted obliquely into the recess 330; the planks to be connected are then brought into alignment. During this part of the movement, the chamfered bottom edge of the toothed profile slides over the hooked side of the ridge 328. The hook and/or the tooth need to deform until they snap into their final position.

The core layer 320 has a fiberglass mat 322 embedded therein. The fiberglass mat 322 extend into the first and second connecting profiles 324, 326. The fiberglass mats 322 enhances dimensional stability and strength of the core layer 320. The thickness of the fiberglass mat 322 is preferably comprised in the range from 0.07 to 0.12 mm. They are coarsely meshed, such that the PVC-based material of the core layer 320 forms one continuous layer penetrating across the openings and interstices (not shown) of the fiberglass mats 322 and firmly retaining the latter.

The core material is chosen such that its coefficient of dynamic friction lies in the range from 0.50 to 0.65 (determined according to European Standard EN 13893.) In the embodiment illustrated in FIGS. 8 and 9, the first and second connecting profiles 324, 326 are shaped such that a contact area (between to engaged connecting profiles) of at least 8 mm$^2$ per mm of length along the edge is formed.

FIG. 9 illustrates the connecting profiles on the short edges of the planks 310 according to the fourth embodiment of the invention. The third 340 and fourth 342 connecting profiles are shaped complementarily to each other. The third connecting profile 340 comprises a recess with a trapezoidal cross section while the fourth connecting profile 342 comprises a protrusion with that cross section. Both the third and the fourth connecting profiles are realised in the core layer 320. Each plank 310 comprises all of the connecting profiles shown in FIGS. 8 and 9.

Figure 10:
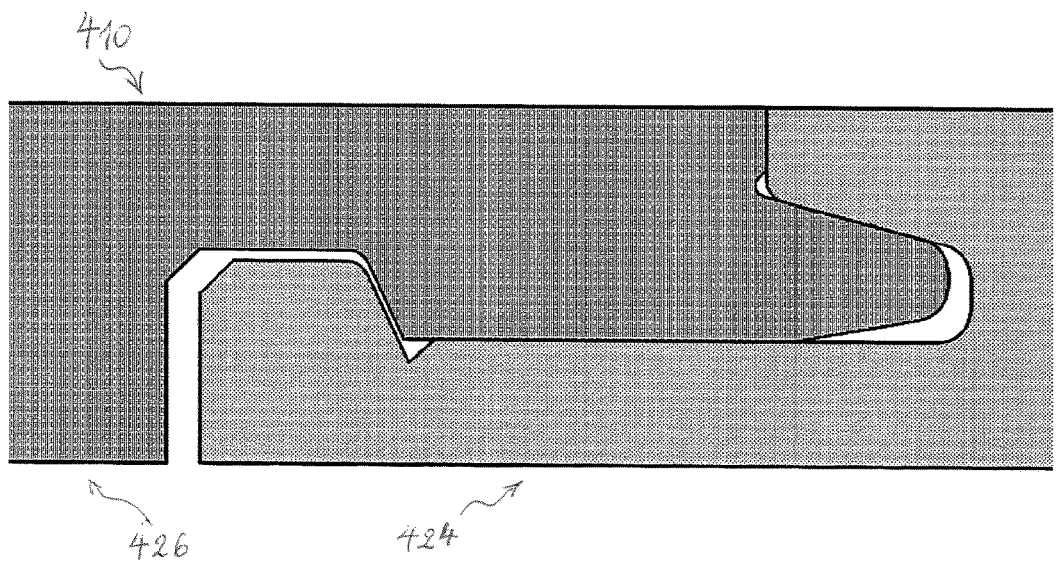
FIG. 10: is a transversal cross-sectional view of first and second connecting profiles of decorative surface covering elements in accordance with a fifth embodiment of the invention.
Figure 11:
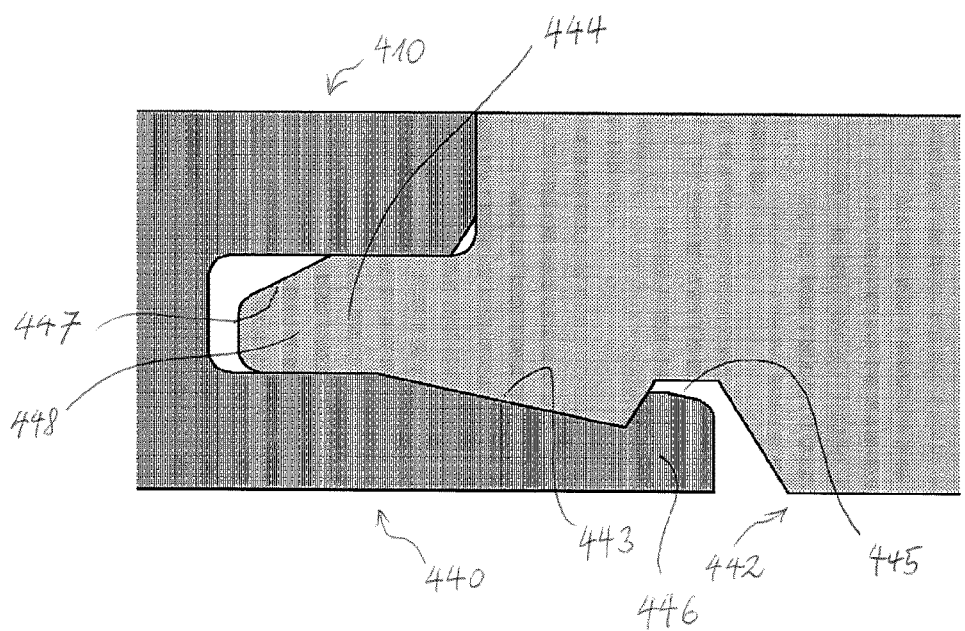
FIG. 11: is a transversal cross-sectional view of third and fourth connecting profiles of the decorative surface covering elements of FIG. 10.

A fifth preferred embodiment of the invention, with planks or tiles as the decorative surface covering elements, is illustrated in FIGS. 10 and 11. Each plank or tile 410 is formed by a multi-layered compound comprising a backing layer, a core layer, a print layer and a transparent wear layer. The internal structure of each plank or tile 410 (not shown in FIGS. 10 and 11) may e.g. be that illustrated in and described with respect to FIG. 2, 4, 7 or 8, respectively. The multi-layered compound may comprise further layers, such as e.g. one or more barrier layers and/or a top varnish. Each plank or tile 410 comprises first and second connecting profiles 424, 426, which are integral with the multi-layered compound. The first connecting profile 424 extends along at least one long edge of the surface covering element. The second connecting profile 426 extends along the other long edge. The first and second connecting profiles 424, 426 are configured for mating with each other and thereby mechanically coupling two adjacent planks or tiles 410. FIG. 11 illustrates the connecting profiles on the short edges of the planks or tiles 410 according to the fifth embodiment of the invention. The third 440 and fourth 442 connecting profiles are shaped complementarily to each other. The third connecting profile 440 comprises a recess while the fourth connecting profile 442 comprises a tongue with a correspondingly shaped cross-section. Each plank 410 comprises all of the connecting profiles shown in FIGS. 10 and 11. For installing the decorative surface covering elements of FIGS. 10 and 11, one preferably holds the plank or tile 410 in such a way that the first connecting profile is at the 12 o'clock position, the third connecting profile 440 at the 3 o'clock position, the second connecting profile 424 at the 6 o'clock position and the fourth connecting profile 442 at the 9 o'clock position (all positions are indicated as they appear on a conventional clock). The user preferably installs a new plank or tile by inserting the first connecting profile 410 of the tile he or she holds in their hands into the second connecting profile of the plank or tile of the last complete row of previously installed planks or tiles and lowers the plank or tile onto the floor. The geometry of the first and second connecting profiles is such that the newly installed tiled may be translated in the direction of the long edge until it comes into abutment on its short edge with a plank or tile on the left or on the right, i.e. the first and second connecting profiles allow for a relative sliding motion along the edge when they are in the connected state and the connected floor covering elements are coplanar. The connection of the third/fourth edge of the newly installed plank or tile is achieved by pushing it horizontally against the neighbouring plank or tile. During that movement, the sloping bottom 443 of the tongue 444 sliding on the tip 445 of the protruding connector base 446 urges the tip 448 of the tongue 444 upwards. As the insertion goes on, the slope portion 447 of the tongue 444 comes into contact with the ceiling of the recess, which guides the tip of the tongue downward into the rear part of the recess. Thus, during the insertion movement, the tip 445 of the connector base 446 first moves up and then down. At the end of the insertion movement, the sloping bottom 443 of the tongue 444 slides into a generally v-shaped groove on the protruding connector base 446. The v-shaped groove has a first side with a low inclination that corresponds to that of the sloping bottom and a second side with a high inclination that corresponds to that of the rear face of the sloping bottom 443. The high inclination of the second side of the groove and the rear face of the sloping bottom 443 secures the tongue against unintentional slipping out of the recess.

It is worthwhile noting that features of the different illustrated embodiments may be combined with each other to form new embodiments of the invention. For instance, the different connection types may be combined with different multilayer structures (with or without a print layer, with or without one or more fiberglass mats, with or without barrier layer(s), etc.) It may also be advantageous to combine different connection profiles in a single surface covering element. For instance, a plank or tile may have the first connecting profile of FIGS. 1 and 2 along a first long edge, the second connecting profile of FIGS. 1 and 2 along a second long edge opposite to the first long edge, the first connecting profile of FIGS. 3-5 along a first short edge and the second connecting profile of FIGS. 3-5 along a second short edge opposite to the first short edge. Alternatively, a plank or tile may have the first connecting profile of FIGS. 1 and 2 along a first long edge, the second connecting profile of FIGS. 1 and 2 along a second long edge opposite to the first long edge, the first connecting profile of FIGS. 6 and 7 along a first short edge and the second connecting profile of FIGS. 6 and 7 along a second short edge opposite to the first short edge. As a further alternative, a plank or tile may have the first connecting profile of FIGS. 3 to 5 along a first long edge, the second connecting profile of FIGS. 3 to 5 along a second long edge opposite to the first long edge, the first connecting profile of FIGS. 6 and 7 along a first short edge and the second connecting profile of FIGS. 6 and 7 along a second short edge opposite to the first short edge.

EXAMPLE 1

The different embodiments of the invention were realised with a 0.5 mm thick backing layer, a 1.7 mm thick PVC-based, fiberglass reinforced core layer, a 0.1 mm thick print layer and a 0.7 mm thick wear layer. The composition of the different layers is indicated hereinafter.

In this example, the core layer comprised of several core sub-layers, one of which was a fiberglass layer. The hardness of the core layer amounted to 91 shore A. The compositions of the different layers were the following:

| Component | Parts by weight |
|---|---|
| Core sub-layer 1 (density: 1.88 g/cm$^3$) | |
| Soft recycled PVC | 369 |
| Plasticizer (DINP, DINCH) | 14 |
| Filler (chalk) | 196 |
| Pigments | 8 |
| Core sub-layer 2 (density: 1.69 g/cm$^3$) | |
| Rigid recycled PVC | 360 |
| PVC | 130 |
| Filler (chalk) | 180 |
| Plasticizer | 17 |
| Stabilizer | 2 |
| Core sub-layer 3 (density: 1.69 g/cm$^3$) | |
| Post-industrial recycled PVC | 691 |
| Filler | 143 |

The wear layer (hardness: 95 shore A, density: 1.235 g/cm$^3$) had the following composition:

| Component | Parts by weight |
|---|---|
| PVC suspension | 194 |
| Plasticizer (DINP, DINCH) | 64 |
| Epoxidized soybean oil | 6.4 |
| Stabilizer | 9 |
| Processing aid | 4 |

The backing layer (hardness: 97.9, density: 1.57 g/cm$^3$) had the following composition:

| Component | Parts by weight |
|---|---|
| Recycled PVC | 646 |
| Filler (chalk) | 212 |
| Plasticizer (DINP, DINCH) | 17 |
| PVC | 119 |
| Stabilizer | 2 |
| Pigments | 5 |

While specific embodiments have been described herein in detail, those skilled in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

The invention claimed is:

1. A decorative surface covering element with a top surface, a bottom surface and lateral edges, said decorative surface covering element having a height of 4 mm or less, said decorative surface covering element being configured as a multi-layered compound comprising a polymer-based core layer laminated between a backing layer and a wear layer, said core layer comprising a core material having a lesser shore hardness than said backing layer and said wear layer;

said decorative surface covering element comprising a first connecting profile, integral with said multi-layered compound, extending along at least one of said edges, said first connecting profile comprising at least one protrusion realised in said core layer, said protrusion having side surfaces for being seized between opposite surfaces of a recess in a second connecting profile, configured for mating with said first connecting profile, of another decorative surface covering element;

said decorative surface covering element comprising a second connecting profile, integral with said multi-layered compound, extending along another one of said edges, said second connecting profile comprising at least one recess realised in said core layer, said recess having opposite surfaces for seizing a protrusion of a first connecting profile of another decorative surface covering element, wherein the first and second connecting profiles form a contact surface in the connected state, wherein the first and second connecting profiles are shaped in such a way that the contact surface that forms in the connected state amounts at least to 7 mm$^2$ per mm along the edges comprising said first and second connecting profiles;

the second connecting profile comprising, a connector base extending parallel to the backing layer and wear layer, a hook-shaped ridge elevated from a top side of the connector base opposite a hooked side of the hook-shaped ridge, the recess having the opposites sides delimited toward the bottom by the connector base and toward the top side by an overhang;

the first connecting profile comprising an overhanging connector base forming the protrusion having the side surfaces for being seized between the opposite surfaces of the recess in the first connecting profile, wherein the front edges of the protrusion are chamfered for facilitating insertion of the protrusion into the recess, the protrusion having on a rear side a toothed profile for co-operating with the hooked side of the hook shaped ridge of the second connection profile, the toothed profile comprising a chamfered bottom edge.

2. The decorative surface covering element as claimed in claim 1, wherein said protrusion comprises a tongue extending parallel to said layers.

3. The decorative surface covering element as claimed in claim 1, wherein said first connecting profile comprises a connector base parallel to said layers and wherein said protrusion comprises a ridge elevated or lowered from said connector base.

4. The decorative surface covering element as claimed in claim 3, wherein said first connecting profile comprises a plurality of protrusions formed as mutually parallel ridges elevated or lowered from said connector base.

5. The decorative surface covering element as claimed in claim 1, wherein said protrusion comprises a barb profile.

6. The decorative surface covering element as claimed in claim 1, wherein said recess comprises an undercut for cooperating with a barb profile.

7. The decorative surface covering element as claimed in claim 1, wherein said second connecting profile comprises a connector base parallel to said layers and a ridge elevated or lowered therefrom.

8. The decorative surface covering element as claimed in claim 1, wherein said second connecting profile comprises a connector base having formed therein a plurality of mutually parallel recesses.

9. The decorative surface covering element as claimed in claim 1, wherein said first and second connecting profiles are shaped in such a way that elastic deformation of at least one of said first and second connecting profiles occurs when said decorative surface covering element is connected with another decorative surface covering element.

10. The decorative surface covering element as claimed in claim 1, wherein the contact surface that forms in the connected state amounts at least to 9 mm$^2$ per mm along the edges comprising said first and second connecting profiles.

11. The decorative surface covering element as claimed in claim 1, wherein the contact surface that forms in the connected state amounts at least to 12 mm$^2$ per mm along the edges comprising said first and second connecting profiles.

12. The decorative surface covering element as claimed in claim 1, wherein the contact surface that forms in the connected state amounts at least to 15 mm$^2$ per mm along the edges comprising said first and second connecting profiles.

13. The decorative surface covering element as claimed in claim 1, wherein said core layer comprises a fiberglass mat embedded and anchored in said core material, said fiberglass mat extending into said first connecting profile.

14. The decorative surface covering element as claimed in claim 1, wherein said backing layer and said wear layer have each a shore C hardness of at least 80 and wherein said core layer has a shore C hardness at least 5 units below the lower of the shore C hardness of said backing layer and the shore C hardness of said wear layer.

15. The decorative surface covering element as claimed in claim 1, wherein said core layer has a coefficient of dynamic friction comprised in the range from 0.50 to 0.65 when determined according to European Standard EN 13893.

16. The decorative surface covering element as claimed in claim 1, wherein the first connecting profile and the second connecting profile are configured so as to allow movement of the connected profiles along the direction of the respective edge when the first connecting profile and the second connecting profile are in the connected state.

17. The decorative surface covering element as claimed in claim 1, comprising a second connecting profile, integral with said multi-layered compound, extending along another one of said edges,
    wherein said second connecting profile comprises at least one recess realised in said core layer, said recess having opposite surfaces for seizing a protrusion of a first connecting profile of another decorative surface covering element,
    wherein said backing layer and said wear layer have each a shore C hardness of at least 80 and wherein said core layer has a shore C hardness at least 5 units below the lower of the shore C hardness of said backing layer and the shore C hardness of said wear layer,
    wherein said core layer has a coefficient of dynamic friction comprised in the range from 0.50 to 0.65 when determined according to European Standard EN 13893, and
    wherein the first and second connecting profiles are shaped in such a way that a contact surface that forms in the connected state amounts at least to 7 mm$^2$ per mm along the edges that are in contact.

18. A method for installing a decorative surface covering on a floor, comprising:
    providing decorative surface covering elements, each one of said decorative surface covering elements having a top surface, a bottom surface and lateral edges, said decorative surface covering element having a height of 4 mm or less,
    each one of said decorative surface covering elements being configured as a multi-layered compound comprising a polymer-based core layer laminated between a backing layer and a wear layer, said core layer comprising a core material having a lesser shore hardness than said backing layer and said wear layer;
    each one of said decorative surface covering elements comprising a first connecting profile, integral with said multi-layered compound, extending along at least one of said edges, said first connecting profile comprising at least one protrusion realised in said core layer, said protrusion having side surfaces for being seized between opposite surfaces of a recess in a second connecting profile, configured for mating with said first connecting profile, of another decorative surface covering element,
    each one of said decorative surface covering elements comprising a second connecting profile, integral with said multi-layered compound, extending along another one of said edges, said second connecting profile comprising at least one recess realised in said core layer, said recess having opposite surfaces for seizing a protrusion of a first connecting profile of another decorative surface covering element;
    wherein the decorative surface covering elements are rectangular and comprise said first and second connecting profiles on a first and a second long edge, respectively, the decorative surface covering elements comprising a third and a fourth connecting profile on a first and a second short edge, respectively;
    laying out the decorative surface covering elements row by row in such a way that the first connecting profile is in 12 o'clock position, the third connecting profile in 3 o'clock position, the second connecting profile in 6 o'clock position and the fourth connecting profile in 9 o'clock position relative to a person laying out the decorative surface covering elements;
    when laying a decorative surface covering element, inserting the first connecting profile thereof into the second connecting profile of the decorative surface covering elements of the previous row, lowering the decorative surface covering element onto the floor, sliding the decorative surface covering element to the left or the right while keeping the decorative surface covering element connected with the previous row and connecting the decorative surface covering element with a previously installed decorative surface covering element on the left or on the right using the third and fourth connecting profiles;
    wherein the first and second connecting profiles form a contact surface in the connected state, wherein the first and second connecting profiles are shaped in such a way that the contact surface that forms in the connected state amounts at least to 7 mm$^2$ per mm along the edges comprising said first and second connecting profiles;
    the second connecting profile comprising, a connector base extending parallel to the backing layer and wear layer, a hook-shaped ridge elevated from a top side of the connector base opposite a hooked side of the hook-shaped ridge, the recess having the opposites sides delimited toward the bottom by the connector base and toward the top side by an overhang;
    the first connecting profile comprising an overhanging connector base forming the protrusion having the side surfaces for being seized between the opposite surfaces of the recess in the first connecting profile, wherein the front edges of the protrusion are chamfered for facilitating insertion of the protrusion into the recess, the protrusion having on a rear side a toothed profile for co-operating with the hooked side of the hook shaped ridge of the second connecting profile, the toothed profile comprising a chamfered bottom edge.

\* \* \* \* \*